Oct. 22, 1963 W. A. BYRD 3,107,474
GRAIN HARVESTER
Filed Sept. 16, 1960 2 Sheets-Sheet 1

INVENTOR.
Wylie A. Byrd
BY
C. W. Coffee
Atty.

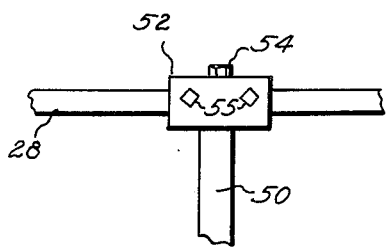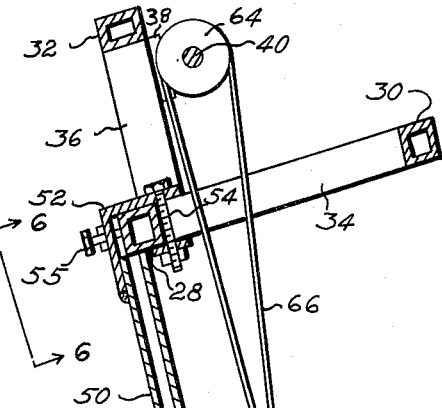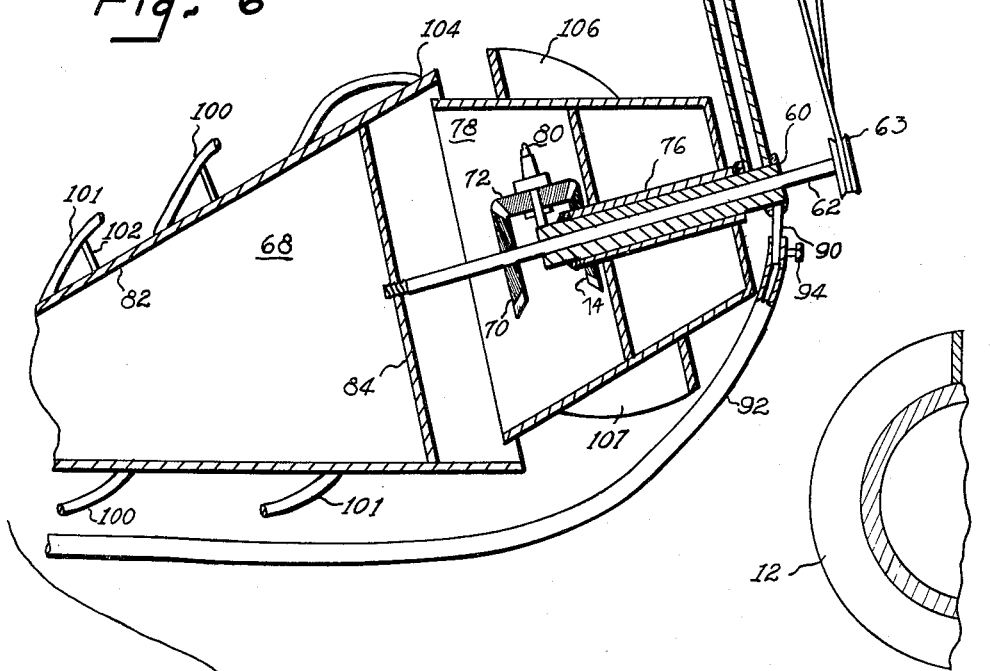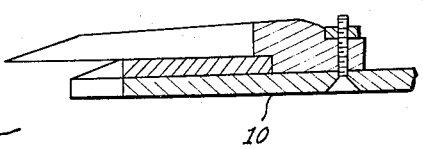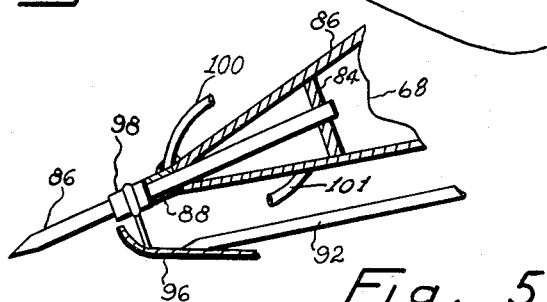

United States Patent Office 3,107,474
Patented Oct. 22, 1963

3,107,474
GRAIN HARVESTER
Wylie A. Byrd, Swisher County, Tex.
(Rte. 2, Tulia, Tex.)
Filed Sept. 16, 1960, Ser. No. 56,539
5 Claims. (Cl. 56—119)

This invention pertains to agricultural harvesting machines and more particularly to an agricultural machine for harvesting grain and similar crops.

This application is a continuation-in-part of my earlier application filed April 1, 1958, Serial No. 725,580, entitled "Agricultural Equipment," now abandoned.

The traditional grain harvesting machine includes a sickle bar cutter which is horizontal to the ground. Immediately behind this is means for conveying the cut material to a thrasher. Traditionally a reel is mounted for rotation about a horizontal axis for forcing the material against the sickle bar and sweeping it on the conveyor means.

The above machine has evolved over many years of application and operates well in the situation for which it is intended wherein the grain carrying stalks extend vertically up from the ground. However, a problem exists when wind and other adverse conditions cause the stalks not to extend vertically upward or for low vine crops like beans or peas. For example, in grain sorghums, often the wind and rain will blow the stalks over and break the stalks so that they are lying on the ground or nearly so.

To harvest such crops under adverse conditions, it is necessary gently to lift them from the ground above the sickle and then drop them on the conveying means. Violent action will shatter the grain.

I have achieved a machine which will exert gentle lifting action. The machine replaces the reel with a pair of rotating cones with one cone on either side of the row. Spiral ribs extend from the surface of the cone. The linear velocity of a portion of the rib will be the angular speed of the cone multiplied by the distance the rib is from the center of rotation. Therefore, at the point of the cone where the rib first contacts the plant it is moving at a relatively small linear velocity. However, after first contact with the rib and the stalk is already set in lifting motion, the radius of the rib from the axis rotation is increased and therefore, the linear velocity is increased. At no time is the plant violently accelerated.

An object of this invention is to harvest crops which are not vertically orientated.

Another object of this invention is to lift gently growing plants.

A further object is to provide a machine which will lift crops to cut the stalks wherein the crops are lying close to the ground.

Still further objects are to achieve the above with a device that is sturdy, compact, durable, simple, and reliable, yet inexpensive and easy to manufacture.

The specific nature of the invention as well as other objects, uses, and advantages thereof will clearly appear from the following description and from the accompanying drawing, the different views of which are not necessarily to the same scale, in which:

FIG. 4 is an enlarged partial sectional view of the attachment taken on a part of line 4—4 of FIG. 1 showing a portion of the existing machine.

FIGURE 5 is an enlarged view of the front of the cone with parts broken away.

FIG. 6 is a partial view taken on line 6—6 of FIG. 4.

Figure 1:
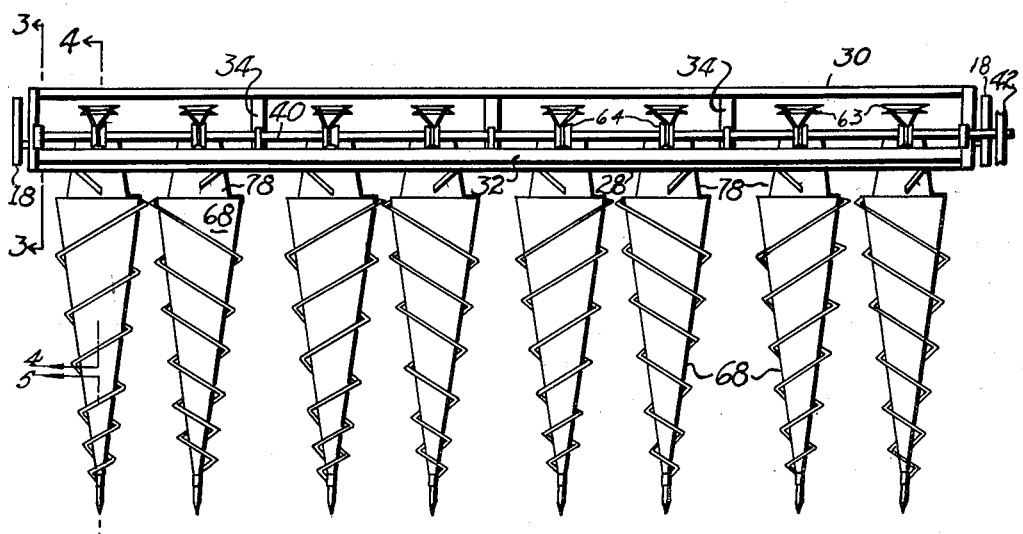
FIG. 1 is a plan view of one embodiment of this invention, showing an attachment disconnected from the machine.
Figure 2:
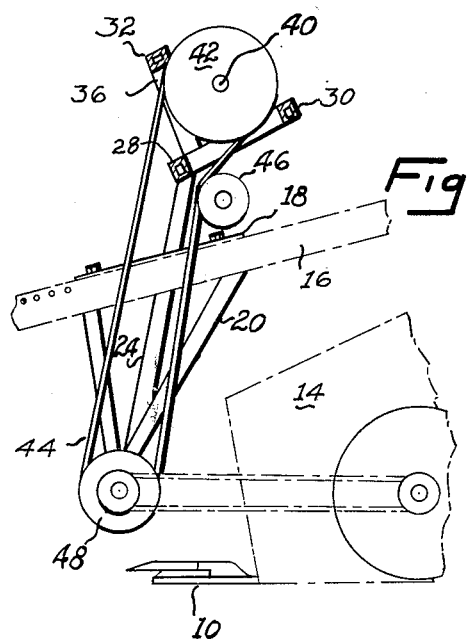
FIG. 2 is a side elevational view of the attachment of FIG. 1 showing only the connection of the attachment to an existing machine.

As may be seen in the accompanying drawing, one embodiment of this invention is made to fit upon a combine.

The combine will have sickle bar 10 for cutting stalks and means 12 for conveying the cut stalks to the other parts of the combine. Likewise, it will have a general frame 14 upon which these are mounted. A pair of arms 16 are associated with this frame 14 which, according to prior practice would carry a horizontal reel.

According to my invention the carrying arm 16 of a conventional reel supporting structure may be used to support my attachment.

Angles 18 on each side of the attachment fit onto the carrying arms and are bolted thereto. The angles 18 are the uppermost part of frames 20. Each frame is of general triangular shape and pivot pin 22 extends inward from the low point. A stanchion 24 is pivoted to each pivot pin. The movement of the stanchion is limited by stops 26 welded to the angle 18. Horizontal bar 28 is welded to the upper end of both stanchions 24. Horizontal bar 28 is one of three bars including side bar 30 and top bar 32 which extends the length of the attachment forming a frame for the attachment. The bar 28 and side bar 30 are connected by numerous cross pieces 34. Upright members 36 extend from top bar 32 to cross members 34 adjacent the bar 28. Pillow blocks 38 are attached to the members 36. Horizontal shaft 40 extends through the pillow blocks. The shaft 40 is rotated by the cooperation of sheave 42 mounted on one end thereof, together with the belt 44 and idler 46. The belt 44 also is trained around sheave 48. Sheave 48 is driven by a suitable mechanism from the main combine. The sheave 48 rotates about an axis concentric to the axis to the pivot pin 22 and it is mounted for rotation upon the frame 20.

Figure 3:
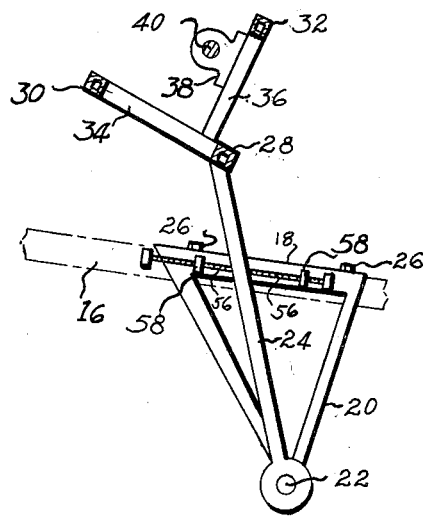
FIG. 3 is a sectional view showing a portion of the attachment and existing machine taken on line 3—3 of FIG. 1.

A plurality of rods or pendants 50 are attached to bar 28 by an attachment which includes angle clip 52 welded to each of the pendants. The top of each pendant butts against the bottom of the bar and is securely clamped thereto by bolt 54. The bolt extends through the horizontal leg of the clip 52 to a washer on the lower side which overhangs a portion of the bar 28 and is held fast by a nut on the end. Two set screws 55 extend through the vertical leg of the clip and bear against the bar 28. The clamp may be adjusted horizontally on the bar 28 by loosening the bolt 54 and sliding the entire pendant one way or the other. The pendant may be rotated about its axis thus making a different angle to bar 28 by tightening one screw 56 and loosening the other. The angle of the bar 28 itself may be changed by rotating the stanchion 24 about its pivot pin 22 (FIG. 3). Two bolts 56 each of which extend through one of two ears 58 welded to the angle 18. The stanchion may be adjusted by tightening one screw 56 while loosening the opposite one.

As a four-row machine is illustrated there will be eight pendants, one for each cone 68. However, only one pendant is illustrated in the drawing, that being in FIG. 4.

Tube 60 is attached by welding or otherwise to the bottom of each pendant 50. The tube forms a bearing through which shaft 62 rotates. The shaft has attached on the one end sheave 63 which is driven from sheave 64 by belt 66. The eight sheaves 64 are attached longitudinally adjustably to the shaft 40.

Cone 68 is attached on the other end of the shaft 62. Bevel gear 70 is attached to the shaft 62 intermediate the terminal of the tube 60 and the cone 68. This bevel gear meshes with jack gear 72 which is mounted for rotation upon the shaft which is welded to the end of tube 60. Second bevel gear 74 meshes with the jack gear 72. The second bevel gear is attached to a tube 76 which is mounted for rotation concentric with tube 60 outside thereof. Concentric roller 78 is attached to tube 76. Grease fitting 80 for lubricating the mechanism is connected to the shaft upon which jack gear 72 rotates.

The cone has an outer shell 82. The shell has one or more interior braces or heads 84, the largest of which has axial threaded hole into which the shaft 62 threads. Pointed shaft 86 extends from the apex of the cone. It is attached into a small head adjacent the apex and extends through a collar 88 at the apex.

Pin 90 is welded to the tube 60 opposite where the tube is welded to the pendant 50. Hollow brace 92 slides over the pin 90 and attaches thereto by set screw 94. The brace extends down to adjacent the apex of the cone where it terminates with shoe or gauge 96. The shoe is adapted to slide along the surface of the ground and prevent the point of the cone from digging into the ground. As seen in the drawings, the apex of each cone is lower than the center of the base of the cone. Shaft 86 extends through bearing 98 which is attached to the shoe. The brace 92 supports the apex of the cone.

Rods or ribs 100 and 101 are attached spirally or helically to the outside of the cone. The rods are spaced away from the surface of the cone by spacers 102 which are welded both to the surface of the cone and to the rods. The terminals of each rod bends in to the surface of the cone and are welded thereto. At the apex, the weld is to the collar 88; this may be considered a portion of the cone itself. Two flights of rods 100 and 101 are used so that there is a double spiral or twin helices. The helical angle on adjacent cones is opposite. Adjacent cones rotate in opposite directions because belts 66 are twisted in opposite directions. The cones are rotated in such a direction that the vegetation to be lifted is lifted and carried from the apex to the base of the cone by the flight of rods 100 and 101 thereon.

Rollers 78 are truncated cones. They have dual or twin helical flights of blades or ribs 106 and 107 mounted on the outside thereof. The angle of the flight 106 and 107 is in the opposite direction to the angle of the rods 100 and 101 on the coaxial cone. The rollers will rotate in the opposite direction of the co-axial cone. Therefore, the flights will urge the vegetation rearwardly and downwardly. The base of the cone overlaps the roller, i.e., the roller is telescoped within the cone. The rods on the cones will gently lift the vegetation and carry it back to the point where the stalks are cut by sickle bar 10. At about this point, the vegetation is carried on back and down by the flights 106 and 107 on the rollers. There is a pair of cone-roller units for each row of growing crop, one cone-roller unit operating on either side. Vegetation is prevented from clinging or clogging and choking up between the rods and cone because the forward ends of the rods are bent in and welded to the surface of the cone.

As previously explained, the cones are fully adjustable. The angle that the cones are set in relation to the ground may be adjusted by the screws 58 as described. The distance of the cone from the row may be adjusted by sliding the clip one way or the other. The angle the cone makes in respect of the row of growing crop may be adjusted by the screws 56.

It will be apparent that the embodiments shown are only exemplary and that various modifications can be made in construction, materials, and arrangement within the scope of the invention as defined in the appended claims.

I claim as my invention:

1. A harvester machine having a crop lifting and positioning assembly to facilitate cutting, comprising, a harvester with a horizontally extending cuting means, a support frame mounted on said harvester, said frame rotatably supporting a plurality of paired crop-positioning assemblies in front of said cutting means, each assembly comprising a coaxially mounted conical member and a roller member, the conical member having its apex positioned adjacent the ground, and the roller member being positioned rearwardly of the base of the conical member, said roller being positioned above the cutting means, driving means mounted on said frame and driving said crop-positioning assemblies, one conical member of each paired assembly being driven in one direction and the corresponding roller member being driven in the opposite direction, the cooperative crop-positioning assemblies of each pair having opposite directions of rotation, said conical members having a spiral element thereon, and said roller members also having thereon a spiral element which is of opposite pitch from its corresponding conical member, so that a stalk is lifted up from the ground to an upright position by paired conical members and forced back against the cutting means and then rearwardly and downwardly by paired roller members.

2. The combination as set forth in claim 1 wherein said frame has a horizontally exending bar and depending individual support means for each assembly which is attached to said bar by fastening means to permit adjustment of the horizontal displacement of each crop-positioning assembly.

3. The combination as set forth in claim 1 wherein the conical member and the roller member of each crop-positioning assembly are supported by a rotatable shaft driven by said driving means.

4. The combination as set forth in claim 3 wherein one of the members of the crop-positioning assembly is directly driven by the rotatable shaft and the other element is driven in the opposite direction by a gear assembly powered by said shaft.

5. The combination as set forth in claim 3 wherein said driving means comprises a sheave mounted on the rotatable shaft of each assembly, a longitudinally extending power shaft mounted on the frame and rotated by power means on the harvester, sheaves on the power shaft for rotating the sheaves on the crop-positioning assemblies, and belt means connecting the sheaves on the power shaft to the sheaves on the crop-positioning assemblies.

References Cited in the file of this patent

UNITED STATES PATENTS

| | | |
|---|---|---|
| 2,182,772 | Nightenhelser et al. | Dec. 5, 1939 |
| 2,261,282 | Pond | Nov. 4, 1941 |
| 2,366,408 | Jenson | Jan. 2, 1945 |